(12) United States Patent
Chen

(10) Patent No.: US 6,289,060 B1
(45) Date of Patent: Sep. 11, 2001

(54) METHOD AND APPARATUS FOR PERFORMING A GENERALIZED VITERBI SEARCH TO DEMODULATE A SEQUENCE OF SYMBOLS

(75) Inventor: Weizhong Chen, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/571,872

(22) Filed: May 12, 2000

(51) Int. Cl.$^7$ ............................. H03D 1/00; H04L 27/06
(52) U.S. Cl. ............................. 375/341; 714/795
(58) Field of Search ..................... 375/316, 340, 375/341; 329/792; 714/794, 795–796

(56) References Cited

U.S. PATENT DOCUMENTS

| | | | |
|---|---|---|---|
| 4,571,734 | * 2/1986 | Dolivo et al. | 375/291 |
| 5,159,610 | * 10/1992 | Eyuboglu et al. | 375/290 |
| 5,912,908 | * 6/1999 | Cesari et al. | 714/795 |
| 6,111,923 | * 8/2000 | Mueller et al. | 375/341 |
| 6,134,277 | * 10/2000 | Shah | 375/341 |

OTHER PUBLICATIONS

Scott L. Miller and Robert J. O'Dea, "Multiple Symbol Noncoherent Detection of GMSK", Sep. 1998, IEEE, pp. 1676–1680.

\* cited by examiner

*Primary Examiner*—Stephen Chin
*Assistant Examiner*—Lenny Jiang

(74) *Attorney, Agent, or Firm*—R. Louis Breeden; Roland K. Bowler, II

(57) ABSTRACT

A receiver front end (604) receives sequence of symbols. A processor (606) coupled to the receiver front end computes a metric corresponding to the sequence of symbols. The metric is selected from one of:

(a) a recursive metric having a structure $$m(\bar{a}_k) = m(\bar{a}_{k-1}) + \hat{m}(a_{k-N}, \ldots, a_{k-1}, a_k),$$

wherein $m(\bar{a}_{k-1})$ and $m(\bar{a}_k)$ are the cumulative metrics for symbols up to $a_{k-1}$ and $a_k$, respectively, and $\hat{m}(a_{k-N}, \ldots, a_{k-1}, a_k)$ is the incremental metric, a function of (N+1) symbols $\{a_{k-N}, \ldots, a_{k-1}, a_k\}$, and (b) a non-recursive metric $m(\bar{a}_k)$ that is an arbitrary function of a set of L submetrics $\{z_1(\bar{a}_k), z_2(\bar{a}_k), \ldots, z_L(\bar{a}_k)\}$ $$m(\bar{a}_k) = m[z_1(\bar{a}_k), z_2(\bar{a}_k), \ldots, z_L(\bar{a}_k)],$$

wherein the set of L submetrics have a generalized recursive structure $$z(\bar{a}_k) = z(\bar{a}_{k-1}) + \hat{z}(\bar{a}_k), l=1, 2, \ldots, L.$$

The processor then optimizes the one of the recursive metric and the non-recursive metric by iteratively extending surviving paths on a trellis diagram to demodulate the sequence of symbols. States of the trellis diagram at t=kT are specified by $\{a_{k-N'+1}, \ldots, a_k\}$, and $N' \geq 1$ is a predetermined integer selected to determine performance and efficiency of computation, wherein $1 \leq N' \leq N$ when the metric selected is the recursive metric.

15 Claims, 2 Drawing Sheets

METHOD AND APPARATUS FOR PERFORMING A GENERALIZED VITERBI SEARCH TO DEMODULATE A SEQUENCE OF SYMBOLS

FIELD OF THE INVENTION

This invention relates in general to wireless communication systems, and more specifically to a method and apparatus for performing a generalized Viterbi search to demodulate a sequence of symbols.

BACKGROUND OF THE INVENTION

The traditional Viterbi algorithm is an efficient search for optimal sequence detection, which requires a recursive metric structure for the metric to be optimized. However, a recursive metric structure does not exist in many maximum likelihood sequence estimation (MLSE) problems. Furthermore, the traditional Viterbi algorithm experiences an exponential increase of computational complexity as the symbol pulse spread increases when applied to partial response channels.

What is needed is a Generalized Viterbi algorithm in which the metric to be optimized can be an arbitrary function. Preferably, the Generalized Viterbi algorithm will solve those MLSE problems unable to use the traditional Viterbi search, in a manner that is near optimal and efficient. Also preferably, those MLSE problems suitable for the traditional Viterbi search will be able to achieve a near optimal solution with a small fraction of the computation. More importantly, different from the traditional Viterbi search, the Generalized Viterbi search will preferably avoid an exponential increase of computation complexity as the symbol pulse spread increases when applied to partial response channels.

DETAILED DESCRIPTION OF THE DRAWINGS

Figure 5:
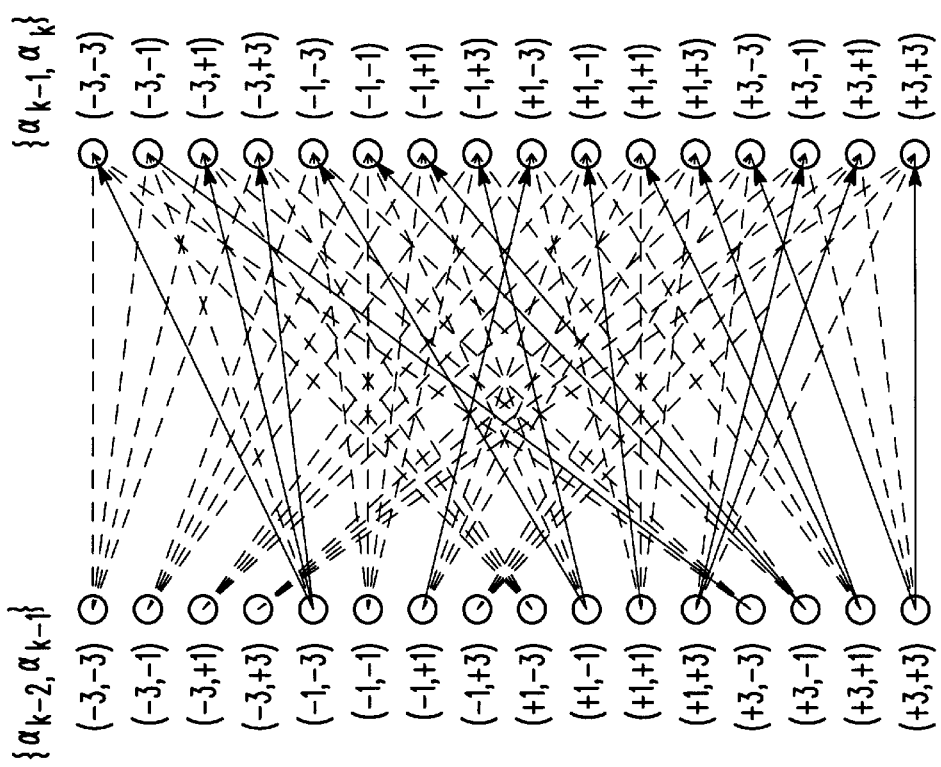
FIG. 5 is a section of the first trellis diagram after trimming in accordance with the present invention.

Maximum Likelihood Sequence Estimation(MLSE) for demodulation is a joint estimation of a sequence of transmitted symbols with the goal of minimizing the sequence error probability. MLSE takes advantage of the predefined signal relationship of the transmitted symbols. The straight-forward implementation of MLSE requires trying $M^K$ symbol sequences, where M is the number of possibilities (states) of a symbol, and K is the number of symbols in the sequence. This order of computational complexity is certainly unrealistic for most applications.

The traditional Viterbi algorithm is an efficient iterative sequence search approach. However, the traditional Viterbi search requires a recursive structure of the metric to be optimized, and not all MLSE problems have a recursive metric structure; thus, the traditional Viterbi algorithm cannot be applied directly in many applications. For example, in solving the non-coherent MLSE problem for continuous phase frequency shift keyed (CPFSK) channel demodulation, in order to obtain a recursive metric to use the traditional Viterbi search, the well-known Miller-O'dea technique can be utilized to simplify the metric. In other words, the Miller-O'dea approach is an optimal search on a suboptimal metric. It has been determined that for a 4-CPFSK channel, for example, the complexity of the Miller-O'dea solution is still overwhelming to currently available digital signal processor (DSP) hardware.

The Generalized Viterbi algorithm disclosed herein in accordance with the present invention is a near-optimal search on an optimal metric. It provides superior performance while maintaining minimal complexity. The Generalized Viterbi algorithm turns out to be so general that a) a variety of MLSE problems unable to use the traditional Viterbi search now have a very efficient implementation, b) those MLSE problems suitable for the traditional Viterbi search now can have a near optimal solution with a small fraction of the computation, and c) easy control is obtainable for trading between complexity and performance. With the Generalized Viterbi search, the metric to be optimized can be an arbitrary function of a set of submetrics, and each submetric has a Generalized Recursive Structure (defined herein). The Generalized Viterbi search works equally well for full and partial response channels. More importantly, the computational complexity of the Generalized Viterbi algorithm for partial response channels remains basically unchanged, instead of experiencing an exponential increase, as in the traditional Viterbi algorithm, when the symbol pulse spread or ISI increases. In addition, the Generalized Viterbi algorithm has no special requirement on the symbol pulse shape. These important features of the Generalized Viterbi algorithm advantageously provide a new degree of freedom in channel signaling design to increase the channel efficiency or capacity. Although CPFSK channels are used as examples herein, the Generalized Viterbi algorithm can be equally well applied to quadrature amplitude modulation (QAM) and other types of channels.

The instantaneous frequency of a CPFSK channel with the symbol sequence $\bar{a}=\{a_k\}$ can be represented by $$f(t,\bar{a})=(f_d/2)\Sigma a_k p(t-kT)$$

where p(t) is the frequency symbol pulse, $f_d$ the frequency deviation of the FSK channel, and $a_k=\{-(M-1), \ldots, -3, -1, 1, 3, \ldots, (M-1)\}$ the digital information for an M-FSK channel. If the frequency symbol pulse p(t) spreads in time over more than one symbol interval T, the channel is referred to as a partial response channel, otherwise a full response channel. In general, the transmitted baseband FM signal of either a partial or a full response CPFSK channel can be represented by $$S(t,\bar{a})=\exp(-j\phi(t,\bar{a}))$$

where $\phi(t, \bar{a})$ is the continuous phase of the CPFSK signal, which is related to $f(t, \bar{a})$ by $$\phi(t, \bar{a}) = 2\pi \int_{-\infty}^{t} f(t, \bar{a})dt$$

The received signal r(t) has a random phase offset $\theta$ with the transmitted signal $s(t, \bar{a})$ and additive white Gaussian noise n(t), thus r(t) can be represented by $$r(t) = e^{j\theta} s(t, \overline{\alpha l}) + n(t)$$

where the phase offset θ is a uniformly distributed random variable over $[-\pi, \pi]$.

In the kth symbol interval $t \in [(k-1)T, kT]$, $$s(t, \overline{\alpha}) = \exp\{j\theta(\overline{\alpha}_{k-2})\}s[t - (k-1)T, \{\alpha_{k-1}, \alpha_k\}],$$

$$s[t, \{\alpha_{k-1}, \alpha_k\}] = \exp\{j[\phi_{\alpha_{k-1}}(t) + \phi_{\alpha_k}(t-T)]\}$$

$$\phi_{\alpha_k}(t) = 2\pi\left\{\int_{-\infty}^{t} f_{\alpha_k}(t)dt\right\} = \pi f_d \alpha_k \int_{-\infty}^{t} p(t)dt$$

$$\theta(\overline{\alpha}_k) = \left(\sum_{i=0}^{k} \alpha_i\right) h\pi$$

The problem of coherent MLSE from the received CPFSK IQ signal r(t) assumes no phase offset or θ=0 between the received signal r(t) and the transmitted signal s(t, ā), and the transmitted symbol sequence $\overline{a} = \{a_k\}$ is detected by maximizing the conditional probability or likelihood function $$p(r|\overline{\alpha}) = \frac{1}{\sqrt{\pi N_0}} \exp\left\{-\frac{1}{N_0} \int |r(t) - s(t, \overline{\alpha})|^2 dt\right\}$$

Maximizing the probability $p(r|\overline{a})$ is equivalent to maximizing the metric $$m(\overline{\alpha}_K) = Re[z(\overline{\alpha}_K)]$$

where $$z(\overline{\alpha}_k) = \int_0^{kT} r(t)\overline{s(t, \overline{\alpha})}dt$$

and $$z(\overline{\alpha}_k) = z(\overline{\alpha}_{k-1}) + \exp\{-j\theta(\overline{\alpha}_{k-2})\}\hat{z}(\alpha_{k-1}, \alpha_k)$$

since both $\int |r(t)|^2$ dt and $\int |s(t, \overline{a})|^2$ dt are independent of the choice of the symbol sequence $\overline{a} = \{a_k\}$ to be detected for constant envelop modulation CPFSK. In addition, $$\hat{z}(\alpha_{k-1}, \alpha_k) = \int_0^T r[t+(k-1)T]\overline{s[t, \{\alpha_{k-1}, \alpha_k\}]}dt$$

where $$\overline{s[t, \{\alpha_{k-1}, \alpha_k\}]}dt$$

is the conjugate of $$s[t, \{\alpha_{k-1}, \alpha_k\}]dt$$

The problem of non-coherent MLSE from the received CPFSK IQ signal r(t) assumes the phase offset θ between the received signal r(t) and transmitted signal s(t, ā) is a uniformly distributed random variable over $[-\pi, \pi]$, thus the transmitted symbol sequence $\overline{a} = \{a_k\}$ is detected by maximizing the conditional probability $$p(r|\overline{\alpha}) = \frac{1}{2\text{J}0} \int_{-\pi}^{\pi} \frac{1}{\sqrt{\pi N_0}} \exp\left\{-\frac{1}{N_0} \int |r(t) - e^{j\theta}s(t, \overline{\alpha})|^2 dt\right\} d\theta$$

Maximizing the probability is equivalent to maximizing $$m(\overline{\alpha}_k) = |z(\overline{\alpha}_k)|^2$$

where $$z(\overline{\alpha}_K) = \int_0^{kT} r(t)\overline{s(t, \overline{\alpha})}dt$$

since, similarly, $\int |r(t)|^2$ dt and $\int |s(t, \overline{a})|^2$ dt are independent of the choice of the symbol sequence $\overline{a} = \{a_k\}$ to be detected. The quantity $z(\overline{a}_k)$ can be calculated as $$z(\overline{\alpha}_k) = z(\overline{\alpha}_{k-1}) + \exp\{-j\theta(\overline{\alpha}_{k-2})\}\hat{z}(\alpha_{k-1}, \alpha_k)$$

where $z(\overline{a}_k)$ and $z(\overline{a}_{k-1})$ are cumulative metrics, and $$\hat{z}(\alpha_{k-1}, \alpha_k) = \int_0^T r[t+(k-1)T]\overline{s[t, \{\alpha_{k-1}, \alpha_k\}]}dt$$

The traditional Viterbi algorithm is an efficient optimal sequence search approach, which removes impossible choices in an iterative fashion. With this iterative search, the exponential number of tries are reduced to a linear number of tries. This iterative approach is optimal. However, it requires the metric to be optimized to have a recursive structure:

$$m(\overline{a}_k) = m(\overline{a}_{k-1}) + \hat{m}(a_{k-N}, \ldots, a_{k-1}, a_k), \quad (1)$$

wherein $m(\overline{a}_{k-1})$ and $m(\overline{a}_k)$ are the cumulative metrics for symbols up to $a_{k-1}$ and $a_k$, respectively, and $\hat{m}(a_{k-N}, \ldots, a_{k-1}, a_k)$ is the incremental metric, a function of (N+1) symbols $\{a_{k-N}, \ldots, a_{k-1}, a_k\}$.

Figure 1:
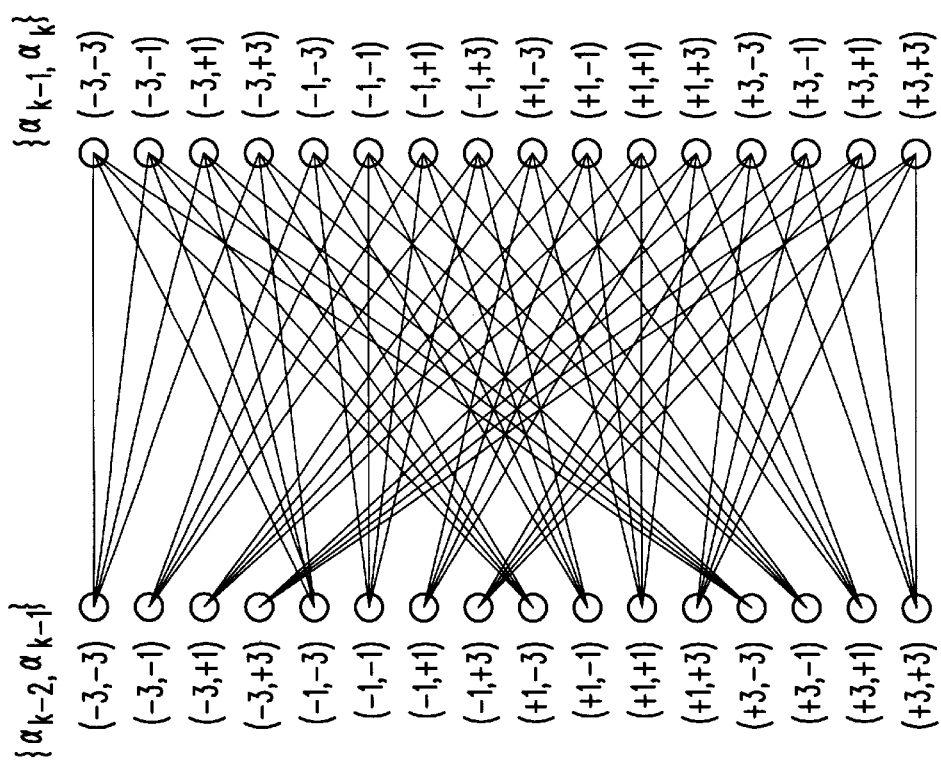
FIG. 1 is a section of a first trellis diagram before trimming in accordance with the present invention.
Figure 2:
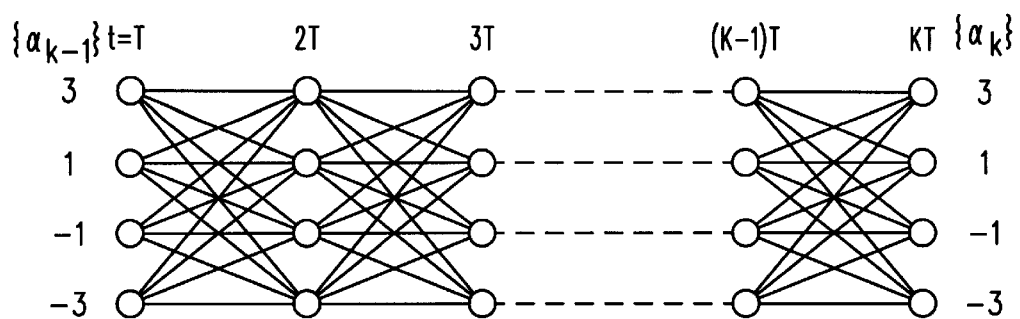
FIG. 2 is a section of a second trellis diagram before trimming in accordance with the present invention.

This iterative optimal search uses a trellis diagram of $M^N$ states, where M is the number of possibilities (states) of the symbols. The states of the trellis at time (k-1)T and KT are specified by $\{a_{k-N}, \ldots, a_{k-2}, a_{k-1}\}$ and $\{a_{k-N+1}, \ldots, a_{k-1}, a_k\}$, respectively. A section of the trellis diagram for M=4 and N=2 is given in FIG. 1 (before trimming). For N=1 and M=4, a section of the trellis diagram is shown in FIG. 2. In the later case, the states of the trellis are identical to the states of the symbols. Each possible path in the trellis diagram from a state at t=T to a state at t=KT represents a possible symbol sequence. The branches in the trellis have their weight, the incremental metric. FIG. 2 depicts M branches entering a state and M branches leaving a state. The MLSE detection is to find an optimal path in the trellis that has the optimal metric $m(\overline{a}_k)$. What follows describes the prior-art traditional Viterbi search.

Figure 3:
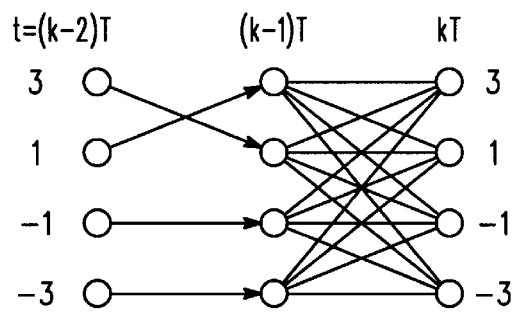
FIG. 3 is a section of a third trellis diagram before trimming in accordance with the present invention.
Figure 4:
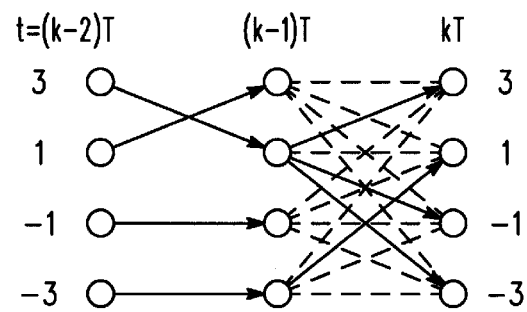
FIG. 4 is a section of the third trellis diagram after trimming in accordance with the present invention.

Assume that only one surviving path to each state at t=(k-1)T has been determined, as shown in FIG. 3 (before trimming). Thus, there are $M^N$ surviving paths in total at t=(k-1)T. Associated with each surviving path, the cumulative metric $m(\overline{a}_{k-1})$ is also available. To determine the surviving path to a state at t=kT, (a) calculate cumulative metrics for the M entering paths to that state from M related surviving paths at t=(k-1)T by equation (1) herein above, and (b) determine the surviving path to that state with the strongest cumulative metric. The operation of (a) and (b) is repeated for all states at t=kT, resulting in one surviving path to each state at t=kT, as is shown in FIG. 4 (after trimming for M=4 and N=1). This process proceeds to t=KT, where K is the total number of symbols, resulting in $M^N$ surviving paths. Of the $M^N$ surviving paths, the one with the best cumulative metric is chosen to be the final optimal path or optimal symbol sequence of the MLSE.

For N=0 and N=1, the trellis has M states, and $M^2$ tries need to be made on each iteration, and $KM^2$ tries need to be made for searching a K-symbol sequence. For N>1, the trellis has $M^N$ states, and $M^{N+1}$ tries need to be made for each iteration, and $KM^{N+1}$ tries are made for searching a K-symbol sequence. It can be proven that the result of this iterative search from the $KM^{N+1}$ tries is identical to that of the straightforward search from trying $M^K$ sequences.

The key to the efficiency gain of the iterative search is the recursive metric structure of equation (1). When the metric used possesses the recursive metric structure, the efficient Viterbi search just described can be applied directly. However, when the metrics to be optimized do not posses the recursive metric structure as, for example, is true for both the coherent and non-coherent CPFSK-MLSE on IQ signal, the traditional Viterbi lo search cannot be used.

The metric to be optimized for the coherent CPFSK-MLSE on IQ signal is not recursive because the incremental metric depends on all symbols up to $a_k$ due to a phase adjustment that is affected by all the preceding symbols. Therefore, in principle, the traditional Viterbi search described above cannot be applied. Similarly, the metric to be is optimized for the non-coherent CPFSK-MLSD on IQ signal does not have the recursive structure either. In order to have a recursive metric structure, Miller and O'dea dropped off certain terms in the metric so that the Viterbi search can be applied. Thus, the Miller-O'dea approach is an optimal search on suboptimal metric. What follows describes the Miller-O'dea simplification.

In the Miller-O'dea simplification, the metric for the non-coherent FSK-MLSE on IQ signal is first expanded $$M(\bar{\alpha}_k) = |m(\bar{\alpha}_k)|^2 = \left|\sum_{l=1}^{k} \exp\{-j\theta(\bar{\alpha}_{l-2})\}\hat{m}(\alpha_{l-1}, \alpha_l)\right|^2$$

$$= \sum_{l=1}^{k} \left\{ |\hat{m}(\alpha_{l-1}, \alpha_l)|^2 + 2\mathrm{Re}\left[\sum_{j=1}^{l-1} \hat{m}(\alpha_{l-1}, \alpha_l)\hat{m}(\alpha_{l-j-1}, \alpha_{l-j})e^{-j\Delta\theta_{l-2}^{(j)}}\right]\right\}$$

To obtain a recursive metric structure, Miller and O'dea dropped all but the first (N−1) terms in the inner sum. The simplified metric becomes $$M^{(N)}(\bar{\alpha}_k) = M^{(N)}(\bar{\alpha}_{k-1}) + \hat{M}^{(N)}(\alpha_{k-N}, \ldots, \alpha_{k-1}, \alpha_k)$$

where $M^{(N)}(\bar{a}_k)$ and $M^{(N)}(\bar{a}_{k-1})$ are the cumulative metrics, and $\hat{M}(a_{k-N}, \ldots, a_{k-1}, a_k)$ is the incremental metric, a function of (N+1) symbols $a_{k-N}, \ldots, a_{k-1}, a_k$.

The search trellis for the suboptimal metric has $M^N$ states, and $M^{N+1}$ tries need to be made in each iteration. For N=2 and M=4, the search trellis has $M^2=16$ states. A section of the trellis before and after the Viterbi trimming is shown in FIGS. 1 and 5.

The following section describes a Generalized Viterbi search in accordance with the present invention. The Generalized Viterbi search provides an efficient, near optimal search on an optimal metric for a variety of MLSE problems that are otherwise unable to be solved by the traditional Viterbi algorithm. Meanwhile, those MLSE problems which are able to be solved by the traditional Viterbi algorithm now can be solved much more efficiently with negligibly small performance impact. The Generalized Viterbi search requires as few as $M^2$ tries to recover a symbol. For the CPFSK-MLSE on IQ signal, the Generalized Viterbi search performs better than the Miller-O'dea approach. The Generalized Viterbi search also performs better than the well-known past-future approach. What follows describes the formulation of the problem that the Generalized Viterbi search is to solve, and the efficient Generalized Viterbi search.

Assume each symbol of the sequence $\bar{a}_k = \{a_1, a_2, \ldots, a_k\}$ to be detected has finite M possibilities (states), and the MLSE of the sequence $\bar{a}_k = \{a_1, a_2, \ldots, a_k\}$ is such that it optimizes (maximizes or minimizes) a metric $m(\bar{a}_k)$ that is an arbitrary function of a set of L submetrics $\{z_1(\bar{a}_k), z_2(\bar{a}_k), \ldots, z_L(\bar{a}_k)\}$ $$m(\bar{a}_k) = m[z_1(\bar{a}_k), z_2(\bar{a}_k), \ldots, z_L(\bar{a}_k)] \tag{2}$$

and these submetrics have the following generalized recursive structure $$z_l(\bar{a}_k) = z_l(\bar{a}_{k-1}) + \hat{z}_l(\bar{a}_k), l=1, 2, \ldots, L \tag{3}$$

where $\bar{a}_k = \{a_1, a_2, \ldots, a_k\}$ is the growing sequence which includes all the symbols up to the kth symbol $a_k$, $z_l(\bar{a}_k)$ and $z_l(\bar{a}_{k-1})$ are the cumulative metrics for symbols up to $a_k$ and $a_{k-1}$, respectively, and the incremental metric $\hat{z}_l(\bar{a}_k)$ is a function of $\bar{a}_k = \{a_1, a, \ldots, a_k\}$, all symbols up to the kth symbol $a_k$. It is clear that the metrics to be optimized for both coherent and non-coherent FSK-MLSE on IQ signal belong to the general class of metrics described in equations (2) and (3) above.

Now, let us look at the differences between the problem in the traditional Viterbi algorithm and the problem in the Generalized Viterbi algorithm. In the traditional Viterbi algorithm, the metric to be optimized cannot be any arbitrary function of a set of submetrics. Secondly, in the traditional Viterbi algorithm the incremental metric is required to be a function of (N+1) symbols $\{a_{k-N}, \ldots, a_{k-1}, a_k\}$ up to $a_k$, instead of all symbols up to $a_k$, and it is this N that determines the number $M^{N+1}$ of tries in each iteration. However, it is noticed that the problem in the traditional Viterbi algorithm is a special case of the problem in the Generalized Viterbi search. Therefore, the problems that the traditional Viterbi algorithm solves can also be solved by the more efficient Generalized Viterbi algorithm. Thus, the suboptimal metric with the Miller-O'dea simplification described earlier advantageously can further enjoy the efficient implementation of the Generalized Viterbi search.

Similar to the traditional Viterbi search, the Generalized Viterbi search extends iteratively the surviving paths on a trellis diagram. However, the trellis diagram in the Generalized Viterbi search is not unique, depending on the choice of performance and efficiency. The states of the Generalized Viterbi search trellis at t=kT are specified by $\{a_{k-N'+1}, \ldots, a_k\}$, where $N' \geq 1$ is a parameter in general, and $1 \leq N' \leq N$ when the Generalized Viterbi search is applied to the metric (1) suitable for the traditional Viterbi search. For M=4 and N'=1, the trellis is identical to that given in FIG. 2, and for M=4 and N'=2, the trellis is identical to that given in FIG. 1 (FIG. 5, after trimming). The number of states of the trellis increases exponentially with the number N', and so does the number of tries in each iteration. Simulation indicates that even the smallest trellis, the trellis with N'=1, provides a near optimal solution.

The iterative approach to extend the surviving path in the Generalized Viterbi search is very similar to that in the traditional Viterbi search, except that (a) the extension of the surviving paths is based on the metric $m(\bar{a}_k)$ which is a function of the submetrics $z(\bar{a}_k)$, l=1, 2, ..., L, (b) the submetrics $z(\bar{a}_k)$, l=1, 2, ..., L are updated from $z_l(\bar{a}_{k-1})$, l=1, 2, ..., L, using the generalized recursive structure (3), and (c) the incremental submetrics $\hat{z}_l(\bar{a}_k)$, l=1, 2, ..., L to extend a surviving path are calculated by using symbol states on that surviving path.

The Generalized Viterbi search takes advantage of the temporary decisions that have been made on the surviving paths, while in the traditional Viterbi search, the temporary decisions on a surviving path are not used for the incremental metric calculation for extending that surviving path. It is this difference that makes it possible for the Generalized Viterbi search to gain efficiency significantly. Meanwhile, it is noticed that this difference also makes the Generalized Viterbi search a non-optimal search. However, simulation shows that the Generalized Viterbi search gives a near-optimal solution. Simulations have demonstrated that the performance impact of this suboptimal search is negligible while the efficiency gain is significant. Meanwhile, those MLSE problems that don't have the recursive metric structure and cannot be simplified to a recursive metric structure advantageously now have an efficient and near-optimal solution.

The discussion above basically follows the case of a channel which is a 4-CPFSK partial response channel with the symbol pulse p(t) that spreads in time within 2 symbol intervals. In general, $M^{N+1}$ tries need to be made in each iteration with the traditional Viterbi search for a p(t) spreading N symbol intervals. In other words, the computational complexity of the traditional Viterbi search increases exponentially with the spread of the symbol pulse. However, the number of tries in each iteration with the Generalized Viterbi search in accordance with the present invention remains at $M^{N'+1}$, where N' is not related to the pulse spread N. N' is a control factor to balance the performance and efficiency. Simulation shows that a near optimal performance is achieved with N'=1, thus the computational complexity of the Generalized Viterbi search basically remains unchanged as the symbol pulse spread N increases. This is because of the fact that as the symbol pulse p(t) increases its spread, although the incremental metric is related to more symbols, the Generalized Viterbi search calculates the incremental metric by using symbol states temporarily determined on the surviving path, and thus does not require more tries. This feature of the Generalized Viterbi algorithm is significant for system design since it gives us a new freedom to design the symbol pulse p(t), thus giving us new potential to make the channel more compact, or further increase the channel capacity.

One type of MLSE metric that cannot use the traditional Viterbi search is, for example, the correlation coefficient metric $$M(\bar{a}) = \frac{\int r_f(t)f(t,\bar{a})dt}{\sqrt{\int r_f^2(t)dt}\sqrt{\int f^2(t,\bar{a})dt}}$$

In this case, it is obvious that it is impossible to make a simplification similar to that which Miller-O'dea made to obtain a recursive metric. However, with the Generalized Viterbi search, the metric can be directly used for an efficient search. The submetrics are $z_1(\bar{a}) = \int r_f(t)f(t,\bar{a})dt$ $z_2(\bar{a}) = \int r_f^2(t)dt$ $z_3(\bar{a}) = \int f^2(t,\bar{a})dt$ where, $z_j(\bar{a})$, j=1, 2, 3 can all be calculated recursively $z_j(\bar{a}_k) = z_j(\bar{a}_{k-1}) + \hat{z}_j(\{a_{k-1},a_k\})$ with $z_j(\{a_{k-1}, a_k\})$ being the incremental metrics given by $$\hat{z}_1(\{a_{k-1}, a_k\}) = \int_0^T r_f(t + (k-1)T)f(t, \{a_{k-1}, a_k\})dt$$

$$\hat{z}_2(\{a_{k-1}, a_k\}) = \int_0^T r_f^2(t + (k-1)T)dt$$

$$\hat{z}_3(\{a_{k-1}, a_k\}) = \int_0^T f^2(t, \{a_{k-1}, a_k\})dt$$

and the metric to determine the surviving paths at t=kT is $$M(\bar{a}_k) = \frac{z_1(\bar{a}_k)}{\sqrt{z_2(\bar{a}_k)}\sqrt{z_3(\bar{a}_k)}}$$

Figure 6:
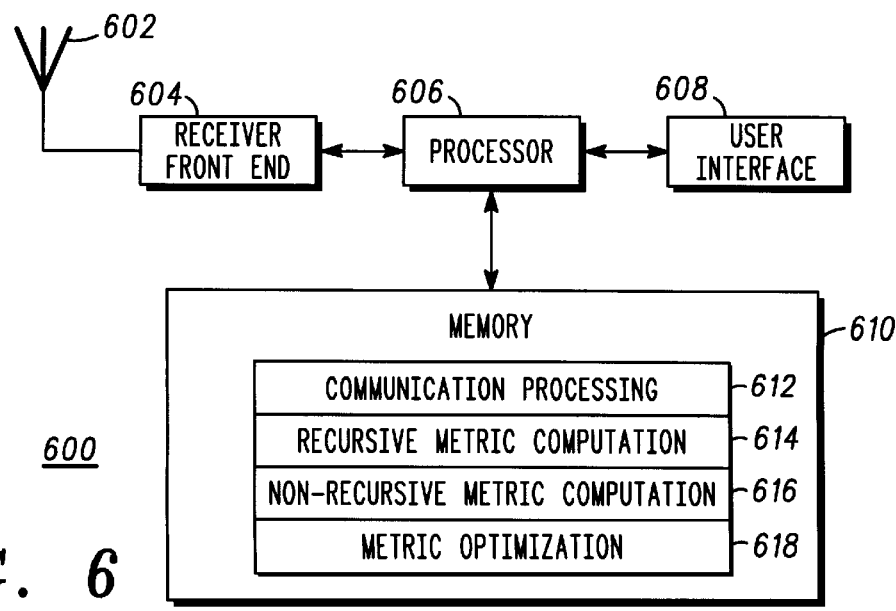
FIG. 6 is an electrical block diagram of a communication receiver in accordance with the present invention.

FIG. 6 is an electrical block diagram of a communication receiver 600 in accordance with the present invention. The communication receiver 600 comprises a conventional antenna 602 coupled to a conventional receiver front end 604 for receiving a sequence of symbols. The communication receiver 600 further comprises a conventional processor 606, such as a digital signal processor, coupled to the receiver front end 604 for controlling the communication receiver 600. A user interface 608 is coupled to the processor 606 for interfacing with a user. The user interface preferably comprises conventional control buttons, a conventional alert, and a display, such as a conventional liquid crystal display.

The communication receiver 600 also includes a conventional memory 610 coupled to the processor 606 for programming the processor 606. It will be appreciated that, alternatively, the memory 610 can be fabricated as an integral portion of the processor 606, as well. The memory 610 comprises a communications processing program 612 for programming the processor 606 to process the communications received by the communication receiver 600. The memory 610 further comprises a recursive metric computation program 614 for programming the processor 606 to process a recursive metric in accordance with the present invention. The memory 610 also includes a non-recursive metric computation program 616 for programming the processor 606 to compute a non-recursive metric in accordance with the present invention. In addition, the memory 610 includes a metric optimization program 618 for programming the processor to optimize the metric in accordance with the present invention.

It should be clear from the preceding disclosure that the present invention provides a method and apparatus for performing a Generalized Viterbi search to optimize a metric, in which the metric to be optimized can be an arbitrary function. Advantageously, the Generalized Viterbi search solves those MLSE problems unable to use the traditional Viterbi search, in a manner that is near optimal and efficient. Also advantageously, those MLSE problems suitable for the traditional Viterbi search are able to achieve a near optimal solution with a small fraction of the computation. More importantly, different from the traditional Viterbi search, the Generalized Viterbi search avoids an exponential increase of computation complexity as the symbol pulse spread increases when applied to partial response channels.

Many modifications and variations of the present invention are possible in light of the above teachings. Thus, it is to be understood that, within the scope of the appended claims, the invention can be practiced other than as specifically described herein above.

What is claimed is:

1. A generalized Viterbi search method for maximum likelihood sequence estimation (MLSE) to demodulate a sequence of symbols received, the method comprising the steps of:

receiving the sequence of symbols;

computing a metric corresponding to the sequence of symbols, the metric selected from one of:

(a) a recursive metric having a structure $$m(\bar{a}_k)=m(\bar{a}_{k-1})+\hat{m}(a_{k-N}, \ldots, a_{k-1}, a_k),$$

wherein $m(\bar{a}_{k-1})$ and $m(\bar{a}_k)$ are the cumulative metrics for symbols up to $a_{k-1}$ and $a_k$, respectively, and $\hat{m}(a_{k-N}, \ldots, a_{k-1}, a_k)$ is the incremental metric, a function of (N+1) symbols $\{a_{k-N}, \ldots, a_{k-1}, a_k\}$, and (b) a non-recursive metric $m(\bar{a}_k)$ that is an arbitrary function of a set of L submetrics $\{z_1(\bar{a}_k), z_2(\bar{a}_k), \ldots, z_L(\bar{a}_k)\}$ $$m(\bar{a}_k)=m[z_1(\bar{a}_k), z_2(\bar{a}_k), \ldots, z_L(\bar{a}_k)],$$

wherein the set of L submetrics have a generalized recursive structure $$z_l(\bar{a}_k)=z_l(\bar{a}_{k-1})+\hat{z}_l(\bar{a}_k), l=1, 2, \ldots, L;$$

and optimizing the one of the recursive metric and the non-recursive metric by iteratively extending surviving paths on a trellis diagram to demodulate the sequence of symbols, wherein states of the trellis diagram at t=kT are specified by $\{a_{k-N'+1}, \ldots, a_k\}$, and wherein $N' \geq 1$ is a predetermined integer selected to determine performance and efficiency of computation, and wherein $1 \leq N' \leq N$ when metric selected is the recursive metric.

2. The method of claim 1, wherein $\bar{a}_k = \{a_1, a_2, \ldots, a_k\}$ is a growing sequence which includes all symbols up to the kth symbol $a_k$.

3. The method of claim 1, wherein $z_l(\bar{a}_k)$ and $z_l(\bar{a}_{k-1})$ are cumulative metrics for symbols up to $a_k$ and $a_{k-1}$, respectively.

4. The method of claim 1, wherein $\hat{z}_l(\bar{a}_k)$ is an incremental metric which is a function of $\bar{a}_k = \{a_1, a_2, \ldots, a_k\}$, all symbols up to the kth symbol $a_k$.

5. The method of claim 1, wherein the optimizing step comprises the step of determining a surviving path to a state at t=kT by:

calculating cumulative metrics $m(\bar{a}_k)$ for M entering paths to said state from M related surviving paths at t=(k−1)T;

determining the surviving path to said state from a strongest cumulative metric;

repeating the calculating and determining steps for all states at t=kT, resulting in one surviving path to each state at t=kT;

continuing to perform the calculating, determining, and repeating steps until t=KT, where K is the total number of symbols; and choosing the surviving path at t=KT with a best cumulative metric as a final optimal path, representing an optimal symbol sequence of the MLSE.

6. An apparatus for performing a generalized Viterbi search method for maximum likelihood sequence estimation (MLSE) to demodulate a sequence of symbols, the apparatus comprising:

a receiver front end for receiving the sequence of symbols; and a processor coupled to the receiver front end, the processor programmed to compute a metric corresponding to the sequence of symbols, the metric selected from one of:

(a) a recursive metric having a structure $$m(\bar{a}_k)=m(\bar{a}_{k-1})+\hat{m}(a_{k-N}, \ldots, a_{k-1}, a_k),$$

wherein $m(\bar{a}_{k-1})$ and $m(\bar{a}_k)$ are the cumulative metrics for symbols up to $a_{k-1}$ and $a_k$, respectively, and $\hat{m}(a_{k-N}, \ldots, a_{k-1}, a_k)$ is the incremental metric, a function of (N+1) symbols $\{a_{k-N}, \ldots, a_{k-1}, a_k\}$, and (b) a non-recursive metric $m(\bar{a}_k)$ that is an arbitrary function of a set of L submetrics $\{z_1(\bar{a}_k), z_2(\bar{a}_k), \ldots, z_L(\bar{a}_k)\}$ $$m(\bar{a}_k)=m[z_1(\bar{a}_k)z_2(\bar{a}_k), \ldots, z_L(\bar{a}_k)],$$

wherein the set of L submetrics have a generalized recursive structure $$z_l(\bar{a}_k)=z_l(\bar{a}_{k-1})+\hat{z}_l(\bar{a}_k), l=1, 2, \ldots, L;$$

wherein the processor is further programmed to optimize the one of the recursive metric and the non-recursive metric by iteratively extending surviving paths on a trellis diagram to demodulate the sequence of symbols, wherein states of the trellis diagram at t=kT are specified by $\{a_{k-N'+1}, \ldots, a_k\}$, and wherein $N' \geq 1$ is a predetermined integer selected to determine performance and efficiency of computation, and wherein $1 \leq N' \leq N$ when the metric selected is the recursive metric.

7. The apparatus of claim 6, wherein $\bar{a}_k = \{a_1, a_2, \ldots, a_k\}$ is a growing sequence which includes all symbols up to the kth symbol $a_k$.

8. The apparatus of claim 6, wherein $z_l(\bar{a}_k)$ and $z_l(\bar{a}_{k-1})$ are cumulative metrics for symbols up to $a_k$ and $a_{k-1}$, respectively.

9. The apparatus of claim 6, wherein $\hat{z}_l(\bar{a}_k)$ is an incremental metric which is a function of $\bar{a}_k = \{a_1, a_2, \ldots, a_k\}$, all symbols up to the kth symbol $a_k$.

10. The apparatus of claim 6, wherein the processor is further programmed to determine a surviving path to a state at t=kT by performing the steps of:

calculating cumulative metrics $m(\bar{a}_k)$ for M entering paths to said state from M related surviving paths at t=(k−1)T;

determining the surviving path to said state from a strongest cumulative metric;

repeating the calculating and determining steps for all states at t=kT, resulting in one surviving path to each state at t=kT;

continuing to perform the calculating, determining, and repeating steps until t=KT, where K is the total number of symbols; and choosing the surviving path at t=KT with a best cumulative metric as a final optimal path, representing an optimal symbol sequence of the MLSE.

11. A communication receiver for performing a generalized Viterbi search method for maximum likelihood sequence estimation (MLSE) to demodulate a sequence of symbols, the communication receiver comprising:

a receiver front end for receiving the sequence of symbols;

a user interface for interfacing with a user; and a processor coupled to the receiver front end and coupled to the user interface, the processor programmed to compute a metric corresponding to the sequence of symbols, the metric selected from one of:

(a) a recursive metric having a structure $$m(\bar{a}_k) = m(\bar{a}_{k-1}) + \hat{m}(a_{k-N}, \ldots, a_{k-1}, a_k),$$

wherein $m(\bar{a}_{k-1})$ and $m(\bar{a}_k)$ are the cumulative metrics for symbols up to $a_{k-1}$ and $a_k$, respectively, and $\hat{m}(a_{k-N}, \ldots, a_{k-1}, a_k)$ is the incremental metric, a function of (N+1) symbols $\{a_{k-N}, \ldots, a_{k-1}, a_k\}$, and (b) a non-recursive metric $m(\bar{a}_k)$ that is an arbitrary function of a set of L submetrics $\{z_1(\bar{a}_k), z_2(\bar{a}_k), \ldots, z_L(\bar{a}_k)\}$ $$m(\bar{a}_k) = m[z_1(\bar{a}_k), z_2(\bar{a}_k), \ldots, z_L(\bar{a}_k)],$$

wherein the set of L submetrics have a generalized recursive structure $$z_l(\bar{a}_k) = z_l(\bar{a}_{k-1}) + \hat{z}_l(\bar{a}_k), l=1, 2, \ldots, L;$$

wherein the processor is further programmed to optimize the one of the recursive metric and the non-recursive metric by iteratively extending surviving paths on a trellis diagram to demodulate the sequence of symbols, wherein states of the trellis diagram at t=kT are specified by $\{a_{k-N'+1}, \ldots, a_k\}$, and wherein $N' \geq 1$ is a predetermined integer selected to determine performance and efficiency of computation, and wherein $1 \leq N' \leq N$ when the metric selected is the recursive metric.

12. The communication receiver of claim 11, wherein $\bar{a}_k = \{a_1, a_2, \ldots, a_k\}$ is a growing sequence which includes all symbols up to the kth symbol $a_k$.

13. The communication receiver of claim 11, wherein $z_l(\bar{a}_k)$ and $z_l(\bar{a}_{k-1})$ are cumulative metrics for symbols up to $a_k$ and $a_{k-1}$, respectively.

14. The communication receiver of claim 11, wherein $\hat{z}_l(\bar{a}_k)$ is an incremental metric which is a function of $\bar{a}_k = \{a_1, a_2, \ldots, a_k\}$, all symbols up to the kth symbol $a_k$.

15. The communication receiver of claim 11, wherein the processor is further programmed to determine a surviving path to a state at t=kT by performing the steps of:

calculating cumulative metrics $m(\bar{a}_k)$ for M entering paths to said state from M related surviving paths at t=(k−1)T;

determining the surviving path to said state from a strongest cumulative metric;

repeating the calculating and determining steps for all states at t=kT, resulting in one surviving path to each state at t=kT;

continuing to perform the calculating, determining, and repeating steps until t=KT, where K is the total number of symbols; and choosing the surviving path at t=KT with a best cumulative metric as a final optimal path, representing an optimal symbol sequence of the MLSE.

* * * * *